United States Patent [19]

Chaplin

[11] Patent Number: 5,051,828
[45] Date of Patent: Sep. 24, 1991

[54] KEYER WITH VARIABLE SHAPING

[75] Inventor: Daniel J. Chaplin, Nevada City, Calif.

[73] Assignee: The Grass Valley Group, Inc., Nevada City, Calif.

[21] Appl. No.: 515,920

[22] Filed: Apr. 27, 1990

[51] Int. Cl.$^5$ .............................................. H04N 5/53
[52] U.S. Cl. .................................. 358/183; 358/182; 358/174
[58] Field of Search ............... 358/183, 182, 177, 174, 358/172, 22, 22 CK, 160

[56] References Cited

U.S. PATENT DOCUMENTS

| | | | |
|---|---|---|---|
| 3,678,182 | 7/1972 | Boxman et al. | 358/22 CK |
| 4,141,041 | 2/1979 | Peters | 358/183 |
| 4,206,474 | 6/1980 | Hermann et al. | 358/22 |
| 4,506,289 | 3/1985 | Shitakami | 358/183 |
| 4,620,228 | 10/1986 | Mikado | 358/160 |
| 4,713,695 | 12/1987 | Macheboeuf | 358/183 |
| 4,800,432 | 1/1989 | Barnett et al. | 358/160 |
| 4,910,592 | 3/1990 | Shroy, Jr. et al. | 358/174 |
| 4,920,415 | 4/1990 | Chaplin | 358/183 |
| 4,947,255 | 8/1990 | Jackson et al. | 358/183 |
| 4,967,277 | 10/1990 | Chaplin | 358/183 |
| 4,970,595 | 11/1990 | Bloomfield | 358/183 |

*Primary Examiner*—James J. Groody
*Assistant Examiner*—Jeffrey S. Murrell
*Attorney, Agent, or Firm*—Francis I. Gray; John Smith-Hill

[57] ABSTRACT

A keyer with variable shaping combines the benefits of a luminance keyer with those of a linear keyer using a single set of gain and clip controls. A key signal is input to a first amplifier having a high gain that is variable over an upper portion of a gain control signal's range. The output of the first amplifier is compared with a clip control signal and input to a second amplifier having a low gain that is variable over a lower portion of the gain control signal's range. The second amplifier includes a feedback circuit that provides minimum gain and shaping when the feedback signal is maximum, and provides maximum gain and shaping when the feedback signal is minimum.

11 Claims, 2 Drawing Sheets

KEYER WITH VARIABLE SHAPING

BACKGROUND OF THE INVENTION

The present invention relates to video keyers used for video special effects, and more particularly to a keyer with variable shaping for combining a fill video signal with a background video signal by combining the benefits of luminance and linear keying.

In video special effects systems key signals are generated to effectively "cut holes" in one video signal to insert another video signal. Two traditional key signal generators are a luminance keyer and a linear keyer. The luminance keyer usually has two controls—a clip and a gain control. The gain control determines the amount of gain used in the key processing, typically in a range of 5-150, and the clip control determines a reference level used in the key processing. The linear keyer has the same controls as the luminance keyer except that the amount of gain used in the key processing is much lower and includes unity gain, typically in a range of 0.2-20 so that the high and low levels enclose the unity gain function. Additionally luminance keyers require special processing called "shaping." The shaping of luminance keys is important as a method of reducing visual artifacts caused by discontinuities in a key control output signal between an intermediate ramp and high and low levels when clipped at the output. For linear keyers the shaping is undesirable since the input key signal is to be faithfully reproduced, and the input key signal may already be shaped. These two keyers are separate functions with a separate set of controls for each keyer.

Therefore what is desired is a single keyer that produces both a luminance key signal and a linear key signal from the same set of controls so that the transition between the two key signal functions is continuous and relatively undetectable to an operator.

SUMMARY OF THE INVENTION

Accordingly the present invention provides a keyer with variable shaping that combines the benefits of a luminance and a linear keyer. A key input signal is amplified by a variable gain amplifier having gain as a function of a gain control signal in the range from 0.5-150. The amplified key signal is compared to a clip reference level that is a function of a clip control signal. The resulting key signal is clipped to a high and a low level. The clipped key signal is shaped to produce a key control signal. The variable gain amplifier has two amplifying sections with the first section being a high gain section that has variable gain during the upper part of the gain control signal range, and with the second section being a low gain section that has variable gain during the lower part of the gain control signal range. The second section uses a feedback amplifier and changes the amount of feedback. The feedback is used to remove the shaping added by the shaping circuit so that as feedback is applied to the second amplifier its gain is reduced and its shaping is reduced. Therefore the overall gain of the variable gain amplifier varies so that the low gain end of the range includes gains required for linear keying with no visible shaping, and the high gain end of the range includes gains required for luminance keying together with the required shaping. Between the low and high gain ends the shaping is gradually added.

The objects, advantages and other novel features of the present invention are apparent from the following detailed description when read in conjunction with the appended claims and attached drawing.

DESCRIPTION OF THE PREFERRED EMBODIMENT

Figure 1:
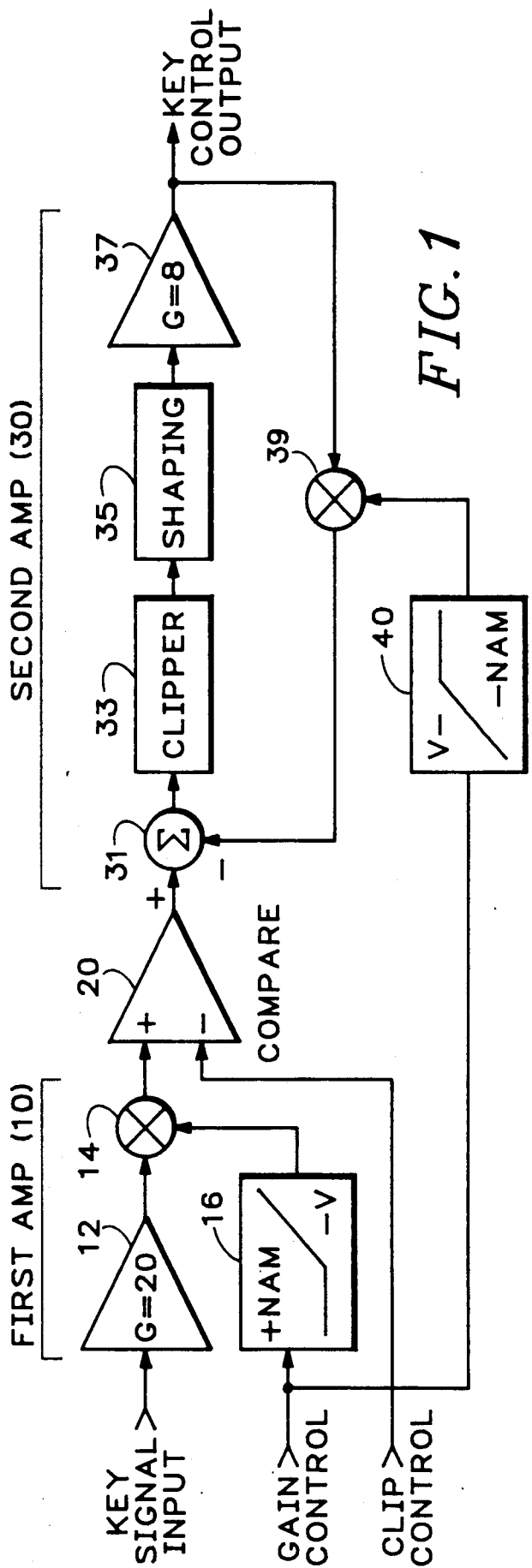
FIG. 1 is a block diagram of a keyer with variable shaping according to the present invention.

Referring now to FIG. 1 a key signal is input to a first amplifier 10, the gain of which is controlled by a gain control signal. The output of the first amplifier 10 is input to a comparator 20 together with a clip control signal. The output of the comparator 20 is input to a second amplifier 30, the gain of which also is controlled by the gain control signal. The output of the second amplifier is a key control signal.

The first amplifier 10 has an input high gain stage 12 to which the key signal is applied. The output of the high gain stage 12 is input to a first multiplier 14 to which a first modified gain control signal is applied. The gain control signal is input to a first non-additive mixer (NAM) 16 that has a linear output characteristic for gain control signal values above a threshold gain control value, V, and a fixed output for gain control values at or below V. The resultant gain of the first amplifier 10 is a fixed gain for gain control signal values below the threshold V and an increasing gain for gain control values over the threshold.

The second amplifier 30 has an input adder 31 for combining the output of the comparator 20 with a feedback signal. The output of the adder 31 is input to a clipper 33 and then shaped by a shaping circuit 35. The output of the shaping circuit 35 is input to a low gain stage 37, the output of which is the key control signal. The key control signal is input to a second multiplier 39 to which is applied a second modified gain control signal. The second modified gain control signal is obtained from a second non-additive mixer (NAM) 40 to which the gain control signal is input. The output characteristic of the second NAM 40 is linear when the input gain control signal is below the threshold V, and a fixed output when the gain control signal is at or above the threshold V. As a result the second multiplier 39 varies the feedback applied to the second amplifier 30 from a maximum amount to zero when the gain control signal is below the threshold V, and causes zero feedback to be applied when the gain control is at or above the threshold V.

Figure 2:
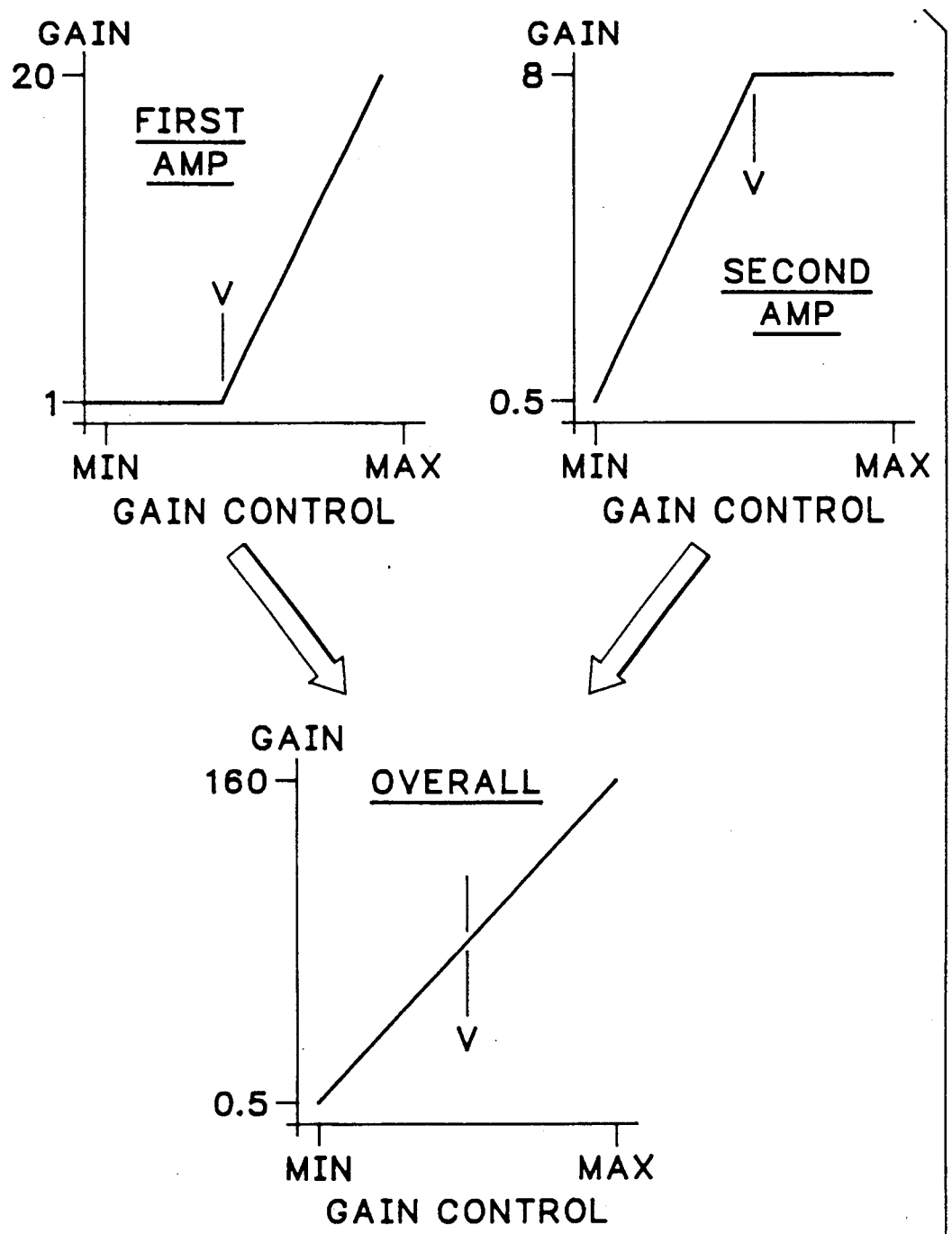
FIG. 2 is a series of gain versus gain control graphs illustrating the operation of the keyer of FIG. 1.

In operation as shown in FIG. 2 the gain of the first amplifier 10 varies from one to maximum, i.e, 20 for the circuit shown in FIG. 1, during the upper part of the gain control signal's range, i.e., above V. The gain of the second amplifier 30 varies from low, i.e., 0.5 for the circuit shown in FIG. 1, to its maximum gain during the lower part of the gain control signal's range, i.e., below V. The overall gain for the keyer is continuous from 0.5 to 160 for the gain values shown in FIGS. 1 and 2. The amount of feedback in the second amplifier 30 determines the maximum gain of the variable gain amplifier. With no feedback the overall amplifier gain is maximum. With full feedback the overall amplifier gain is reduced by the amount of available feedback. Between these points there is a continuous relationship for the resultant gain. It is characteristic of feedback amplifiers that the more feedback applied, the more reduction in distortion. The useful effect here is that shaping added by the shaping circuit 35 is removed by the feedback in the second amplifier 30. With no feedback shaping is unchanged, and with full feedback shaping is reduced by the amount of available feedback resulting in a continuous relationship between these points for the resultant shaping. Therefore as feedback is applied to the second amplifier its gain and shaping are reduced. If enough feedback is applied, the resultant shaping is reduced sufficiently so that it is practically non-existent.

Each of the amplifier gains is varied in such a way so that the gain of the second amplifier 30 goes from minimum gain without shaping to its maximum gain with shaping, and then the gain of the first amplifier 10 varies from its minimum to its maximum. The result is that as the gain control signal is varied, the overall gain of the circuit varies so that the low gain end of the range includes gains required for linear keying with no visible shaping, and at gains above the maximum gain of the second amplifier 30 shaping required for luminance keying is fully present. At gains between unity and the maximum gain of the second amplifier 30 shaping is gradually added.

Thus the present invention provides a keyer with variable shaping that combines the benefits of a luminance keyer and a linear keyer while using a single set of controls. A variable gain amplifier has two stages, the first stage varying in gain over the high gain range and the second stage varying in gain over the low gain range, the second stage including feedback that is maximum for the lowest gain of the second stage and minimum for the highest gain so that shaping is gradually added over the range of one to the maximum gain of the second stage.

What is claimed is:

1. A keyer with variable shaping comprising:
   a variable gain amplifier having a key signal input and producing a variable gain output, the gain of the variable gain amplifier being determined by a gain control signal;
   means for comparing the variable gain output with a clip control signal to provide a comparator output signal; and
   means for variably shaping the signal derived from the comparator output as a function of the gain control signal to produce a key control signal.

2. A keyer as recited in claim 1 wherein the means for variably shaping comprises:
   an amplification stage having as input the signal derived from the comparator output and as an output the key control signal; and
   feedback means for producing the signal derived from the comparator output, the feedback means having as inputs the key control signal, the gain control signal, and the comparator output signal.

3. A keyer as recited in claim 2 wherein the feedback means comprises:
   multiplying means receiving a signal derived from the gain control signal and also receiving the key control signal, and producing a feedback signal;
   summing means receiving the feedback signal and the comparator output signal and producing a difference signal; and
   clipping means for clipping the difference signal to produce the signal derived from the comparator output signal.

4. A keyer as recited in claim 1 wherein the combined gain of the variable gain amplifier and the means for variably shaping has a minimum value of less than unity and a maximum value such greater than unity.

5. A keyer with variable shaping comprising:
   a first amplifier having as inputs a key signal and a gain control signal, and having an output, the gain of the first amplifier being determined by the gain control signal;
   means for comparing the output of the first amplifier with a clip control signal to provide a preliminary key control signal; and
   a second amplifier comprising a first stage having an input that is coupled to receive a signal derived from the preliminary key control signal, the first stage having an output, and a second stage having an input connected to the output of the first stage and an output at which a key control signal is provided, one of said stages being a shaping stage and the other of said stages being a gain stage.

6. A keyer as recited in claim 5 wherein the combined gain of the first amplifier and the second amplifier has a minimum value of less than unity and a maximum value much greater than unity.

7. A keyer as recited in claim 6 wherein the first amplifier comprises:
   a high gain stage having the key signal input;
   a first multiplier to which the output of the high gain stage is input together with a first modified gain control signal, the output of the first multiplier being input to the comparing means; and
   means for generating the first modified gain control signal from the gain control signal so that the gain of the first amplifier varies over the upper part of the gain control signal's range.

8. A keyer as recited in claim 7 wherein the second amplifier comprises:
   means for clipping the output of the comparing means between a high and a low level, the output of the clipping means being input to the shaping stage;
   a low gain stage to which the output of the shaping means is input, the output of the low gain stage being the key control signal;
   a second multiplier to which the key control signal is input together with a second modified gain control signal, the output of the second multiplier being a feedback signal;
   means for generating the second modified gain control signal from the gain control signal so that the gain of the second amplifier varies over the lower part of the gain control signal's range; and
   means for combining the feedback signal with the output of the comparing means at the input of the clipping means to control the gain of the second amplifier and the shaping of the key control signal.

9. A keyer as recited in claim 5 wherein:
   the first amplifier has a gain that varies as a function of the gain control signal when the gain control signal is in an upper part of its range, but does not vary as a function of the gain control signal when the gain control signal is in a lower part of its range; and
   the second amplifier has a gain that varies as a function of the gain control signal when the gain control signal is in a lower part of its range, but does not vary as a function of the gain control signal when the gain control signal is in an upper part of its range.

10. A keyer as recited in claim 9 wherein the first stage of the second amplifier is the shaping stage and the second amplifier further comprises:
- means for clipping an input signal derived from the preliminary key control signal between a high level and a low level, the output of the clipping means being input to the shaping stage;
- means for generating a modified gain control signal from the gain control signal;
- a multiplier to which the key control signal is input together with the modified gain control signal, the output of the multiplier being a feedback signal, and
- means for combining the feedback signal with the output of the comparing means to provide the input signal of the clipping means.

11. A keyer as recited in claim 9 wherein the combined gain of the first amplifier and the second amplifier has a minimum value of less than unity and a maximum value much greater than unity.

* * * * *